United States Patent
Farros et al.

(10) Patent No.: US 6,717,686 B1
(45) Date of Patent: Apr. 6, 2004

(54) ELECTRONIC PRINTING SYSTEM AND METHOD

(75) Inventors: Royal P. Farros, Woodside, CA (US); Ryan Bell, Mountain View, CA (US); Nickoletta T. Farros, Los Gatos, CA (US); David Hodson, Palo Alto, CA (US); Igor Pozdnyakov, Mountain View, CA (US); Michael Rubin, Atherton, CA (US)

(73) Assignee: iPrint.com, Redwood City, CA (US)

( * ) Notice: Subject to any disclaimer, the term of this patent is extended or adjusted under 35 U.S.C. 154(b) by 0 days.

(21) Appl. No.: 09/568,644

(22) Filed: May 10, 2000

Related U.S. Application Data

(60) Provisional application No. 60/166,642, filed on Nov. 19, 1999.

(51) Int. Cl.[7] .............................................. G06F 15/00
(52) U.S. Cl. ........................ 358/1.1; 358/1.15; 358/1.18
(58) Field of Search ................................ 358/1.1, 1.12, 358/1.13, 1.14, 1.15, 404, 407, 468; 705/400

(56) References Cited

U.S. PATENT DOCUMENTS

| | | | | |
|---|---|---|---|---|
| 5,758,048 A | * | 5/1998 | Greulich et al. | ............ 707/505 |
| 6,076,080 A | * | 6/2000 | Morscheck et al. | ......... 705/400 |
| 6,337,745 B1 | * | 1/2002 | Aiello, Jr. et al. | ......... 358/1.15 |
| 6,356,923 B1 | * | 3/2002 | Yano et al. | ................. 707/513 |

* cited by examiner

*Primary Examiner*—Mark Wallerson
(74) *Attorney, Agent, or Firm*—Gray Cary Ware & Freidenrich

(57) ABSTRACT

A user of an electronic printing system in accordance with the invention may create custom print designs locally and provide those custom print designs to a local or remote printer for printing. Upon a user creating a custom print design, the electronic printing system may store the custom design information until an order is placed by the user. Every order may have associated design files and an order file (for example, multiple items in an order). The design file(s) may describe the initial layout of a print design and may reflect updates to the initial layout based upon the custom design created by a user. An imaging engine resident on the remote server(s) of the electronic printing system may convert the information in the design file(s) into an image file for on-screen representation as well as a "ready-to-print" output file that may be retrieved electronically by a remote or local printer facility. The order file may contain user information and product data, such as a user's billing and shipping address, payment information and the media type desired. When an order is submitted, both the design file(s) and the order file may staged for conversion. The files may be converted into printer specific files and may be retrieved electronically by a remote or local printing facility and the user's order may be carried out by the printing facility and may be sent to the user when completed.

61 Claims, 17 Drawing Sheets

```
layouta.des - Notepad
 Eil    Edit    S orch   Help
PRODUCT=bcard/hcard/single
Product_SIZE=0,0,3.5,2
LAYOUT_NAME=LAYOUTA.DES
BACKGROUND=
ZOOM=1
GRAPHIC_START
    FILE=hidden\default.wmf
    NAME=Graphic
    BOX=2.7125,0.745,3.3125,1.255
    COLOR=BLACK
    ALIGNMENT=RIGHT
    SPACING=MIDDLE
    MOVE_BOX=0.4,0.18753.3125,1.8125
    SBOX=2.710417,0.7447916,3.314584,1.255208
GRAPHIC_END
LINE_START
    NAME=Line
    BOX=0.3, 0.1875,0.3,1.8125
    COLOR=BLACK
    MOVE_BOX=0.4,0.1875,3.3125,1.8125
    WIDTH=1
    STYLE=0
LINE_END
TEXT_START
    NAME=Name
    TEXT=Your Name Here
    FONT=Arial
    FONTATTR=BOLD
    FONTSIZE=8
    BOX=0.4,0.1875,3.3125,1.8125
    COLOR=BLACK
```

40 fig. 3B

Karteek Patel
321 Ribbonwood Avenue
San Jose, CA 95123-4453
(408)972-1333

UMB Bank, N.A.
Kansas City, Missouri 64141
18-65V1010

1001

PAY TO THE
ORDER OF _____ $ _____

_____ DOLLARS

Karteek Patel

MEMO _____          _____

001001     101000695     0123     4567

---

Karteek Patel
321 Ribbonwood Avenue
San Jose, CA 95123-4453
(408)972-1333

UMB Bank, N.A.
Kansas City, Missouri 64141
18-65V1010

1002

PAY TO THE
ORDER OF _____ $ _____

_____ DOLLARS

Karteek Patel

MEMO _____          _____

001002     101000695     0123     4567

---

Karteek Patel
321 Ribbonwood Avenue
San Jose, CA 95123-4453
(408)972-1333

UMB Bank, N.A.
Kansas City, Missouri 64141
18-65V1010

1003

PAY TO THE
ORDER OF _____ $ _____

_____ DOLLARS

Karteek Patel

MEMO _____          _____

```
GRAPHIC_START
    NAME=Graphic
    FILE=hidden\default.wmF
    MOVE_BOX=0.4,0.1875,3.3125,1.8125       ⎫
    SBOX=2.710417,0.7447916,3.314584,1.255208  ⎬—41
    COLOR=BLACK                              
    ALIGNMENT=RIGHT
    SPACING=MIDDLE                           ⎭
GRAPHIC_END
```

50 fig. 6A

ELECTRONIC PRINTING SYSTEM AND METHOD

This application claims the benefit of Provisional Application No. 60/166,642, filed Nov. 19, 1999.

The present invention relates to electronic printing systems, and more specifically to an electronic printing system and method for an adaptable print design studio.

BACKGROUND OF THE INVENTION

A variety of software applications are available that allow for the creation of several types of printed documents, such as business and greeting cards, stationery and slides. Some applications allow for the printing of such documents on a conventional printer, such as may be found in a home or an office environment.

However, for certain types of printable media that require high quality printing, or if a large volume of documents. is desired to be printed, then the services of a printing facility are required. Often, such facilities contain a variety of specialized printing machinery to facilitate the printing of large volumes of printed products onto a variety of different printable media including plain paper, preprinted paper, business cards, and stationery. In addition, such printing facilities may have the capability to print onto physical objects, such as cloth T-shirts, caps and coffee mugs.

While software application programs, such as those mentioned above, enable the creation of printable documents and local printing of those documents, they lack the mechanisms to allow for the electronic transfer of the documents to the necessary printing facility. With these typical software programs, the transfer of information necessary for the printing of the document is carried out either by storing the document to a transportable storage medium, such as a floppy disk, or by printing the document onto paper by use of a local printer and having the information reentered and formatted in a system at the printing facility. In either case, the transfer of information is both time consuming and burdensome.

Some software applications, such as remote print kiosks, allow for the electronic transfer of documents to a printing facility but are limited in the types of documents that may be created and transmitted. While such programs may enable the creation and transmission of one type of document, such as stationery, they are incapable of the creation and transmission of other types of documents, such as those documents to be placed on mugs, golf balls, T-shirts, etc. In addition, certain print mediums, such as Post-it® Notes and golf balls, are generally not available for large quantity custom print jobs.

Therefore, there is a need in the art for an electronic printing system in which print orders may be designed and transmitted electronically to a remote or local printer facility so as to be printed remotely or locally in accordance with the order request, regardless of the desired print medium. Further, it is desirable to provide an electronic printing system in which the design tool and remote or local printing facilities are integrated into a seamless environment. It is to these ends that the present invention is directed.

SUMMARY OF THE INVENTION

A user of an electronic printing system in accordance with the invention may create custom print designs and provide those custom print designs to a remote or local printer for printing. Upon a user creating a custom print design, the electronic printing system may store the custom design information until an order is placed by the user. Every order may have an order file and one or more associated design files (for example, multiple items in an order). It should be noted that the design files are not limited to computer files but could be objects and other design structures. The design file(s) may describe the initial layout of a print design and may reflect updates to the initial layout based upon the custom design created by a user. Imaging engines resident on the remote servers of the electronic printing system may convert the information in the design file(s) into a graphic file for on-screen representation as well as a "ready-to-print" output file that may be retrieved electronically by a remote or local printer facility. The order files may contain user information and product data, such as a user's billing and shipping address, payment information, the type of media type desired and the ink types and print qualities desired. When an order is submitted, it is staged for conversion. Both the design files and the order files may be converted to printer specific files that may be retrieved electronically by a remote printing facility. The user's order may be carried out by the printing facility and may be sent to the user when completed.

BRIEF DESCRIPTION OF THE DRAWINGS

FIG. 3B illustrates an example of a portion of a design file that is created by the electronic printing system and that is modified when a user makes modifications to the default design of FIG. 3A to create a custom print order;

FIG. 4 illustrates a graphical representation of three business checks that can be created using the custom design process of the present invention in which the information on the checks is replicated in accordance with the invention;

FIG. 6A illustrates a portion of a design file that is created by the electronic printing system when a user designs a graphical design element that may be displayed to a user in realtime;

DETAILED DESCRIPTION OF THE PREFERRED EMBODIMENT

Figure 1:
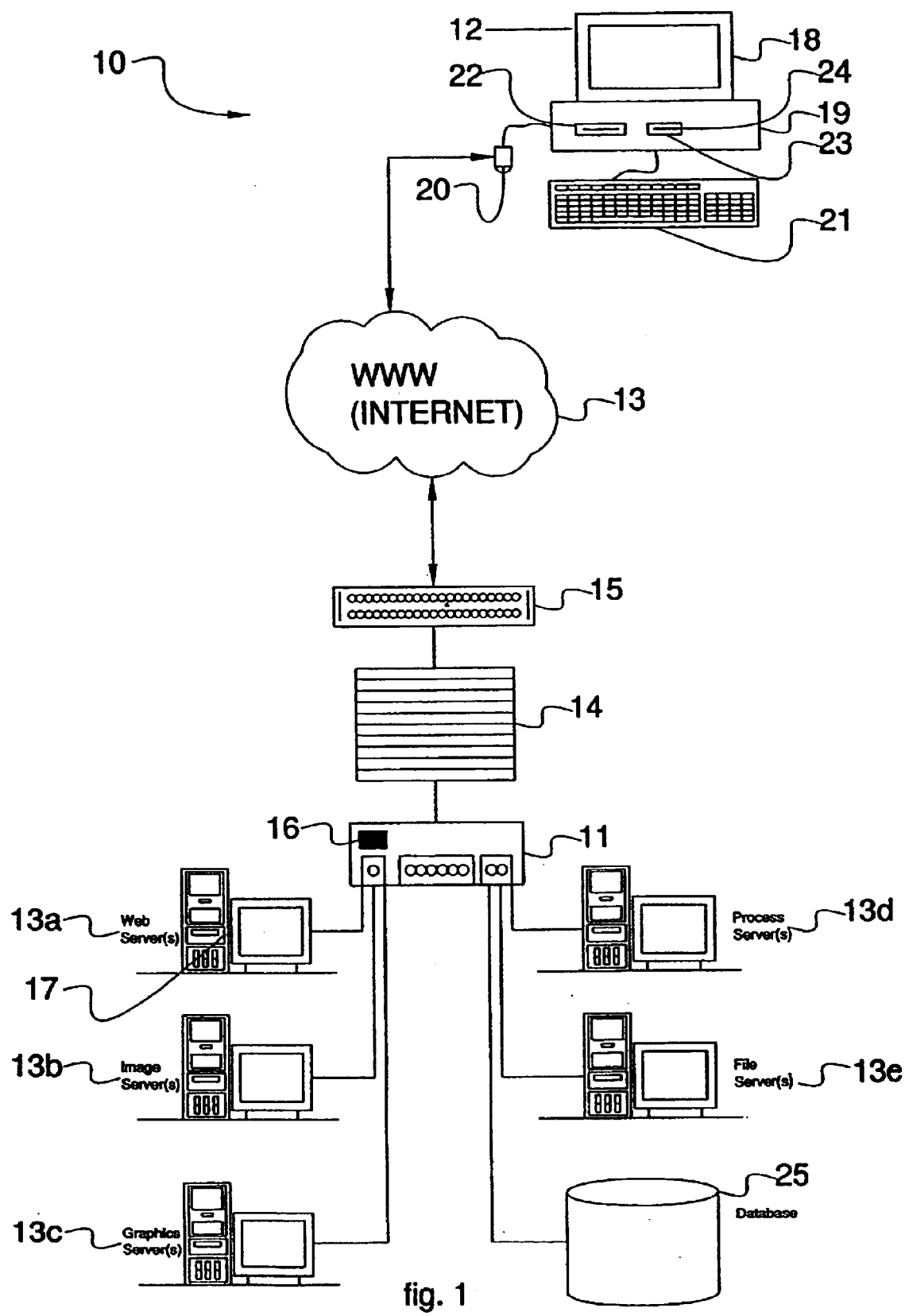
FIG. 1 is a schematic diagram of an electronic printing system network in accordance with the invention.

FIG. 1 shows a schematic diagram of an electronic printing system network 10 in accordance with the invention. A system 10 may include a remote server hub 11 connected with one or more clients 12 across a wide area network (WAN) 13, such as the Internet, or more particularly, the World Wide Web. It should be noted that while the electronic printing system 10 may be provided over the World Wide Web it may also be provided on stand-alone computer systems, intranets, etc. The server hub 11 may be connected to the Internet 13, for example, through a protected firewall 14 and dual T1 lines 15. The server hub 11 may contain one or more pieces of software code 16 that may be stored on various servers 13a–e, may be accessible to each server 13a–e via the server hub 11, and may be executed by microprocessors 17 in the servers 13a–e in order to operate as the electronic printing system 10. The Internet permits the servers 13a–e, when accessed by an individual client 12, to display a web page on the client's 12 computer which permits the client 12 to interact with the servers 13a–e. The individual servers 13a–e may include one or more web servers 13a, one or more image servers 13b, one or more graphics servers 13c, one or more process servers 13d, and one or more file servers 13e. The function and interrelationship of these servers 13a–e will be described in detail herein. While the system is described herein as a plurality of servers, it should be noted that the system is also capable of being embodied as a single server, having systems capable of performing as the electronic printing system of the invention. The description herein is merely for exemplary purposes and is not considered to be limiting.

The client 12 computer system may include a display device 18, a chassis 19, and one or more user input devices, such as a mouse 20 and a keyboard 21. The chassis 19 may house a permanent storage system 22, such as a hard disk drive, optical disk drive, tape drive, or the like, which may store one or more software applications such as a web browser application. The client 12 computer system may have a memory 23 resident therein and the software application from the disk may be transferred to the memory 23 to be executed by a CPU 24. The browser application may be configured to connect the client 12 to the server hub 11 over the WAN 13 and receive graphical information (web pages) that may be displayed on the display device 18 to the user. The browser application may also permit the client 12 to interact with the servers 13a–e, such as for creating or editing electronic printing templates in a database(s) 25 that may reside on the remote servers 13a–e in accordance with the invention.

The database(s) 25 may include a large number of records, which may be accessed by the various servers 13a–e. For example, the database(s) 25 may include records pertaining to customer personal information, such as shipping information. The database(s) 25 may also include records pertaining to customer billing information, order histories, order status, pricing information, sales tax information, printer information and printer attributes, such as which printer plant may be best utilized for a printing product based, in part, on customer location. Additionally, the database(s) 25 may include store attributes, product attributes, shipping carriers, options, and costs, and printer-specific information, such as ink colors and media type. It should be understood that the database(s) 25 may include additional record information that has not been described here, and is not limited to the records set forth herein.

Figure 2:
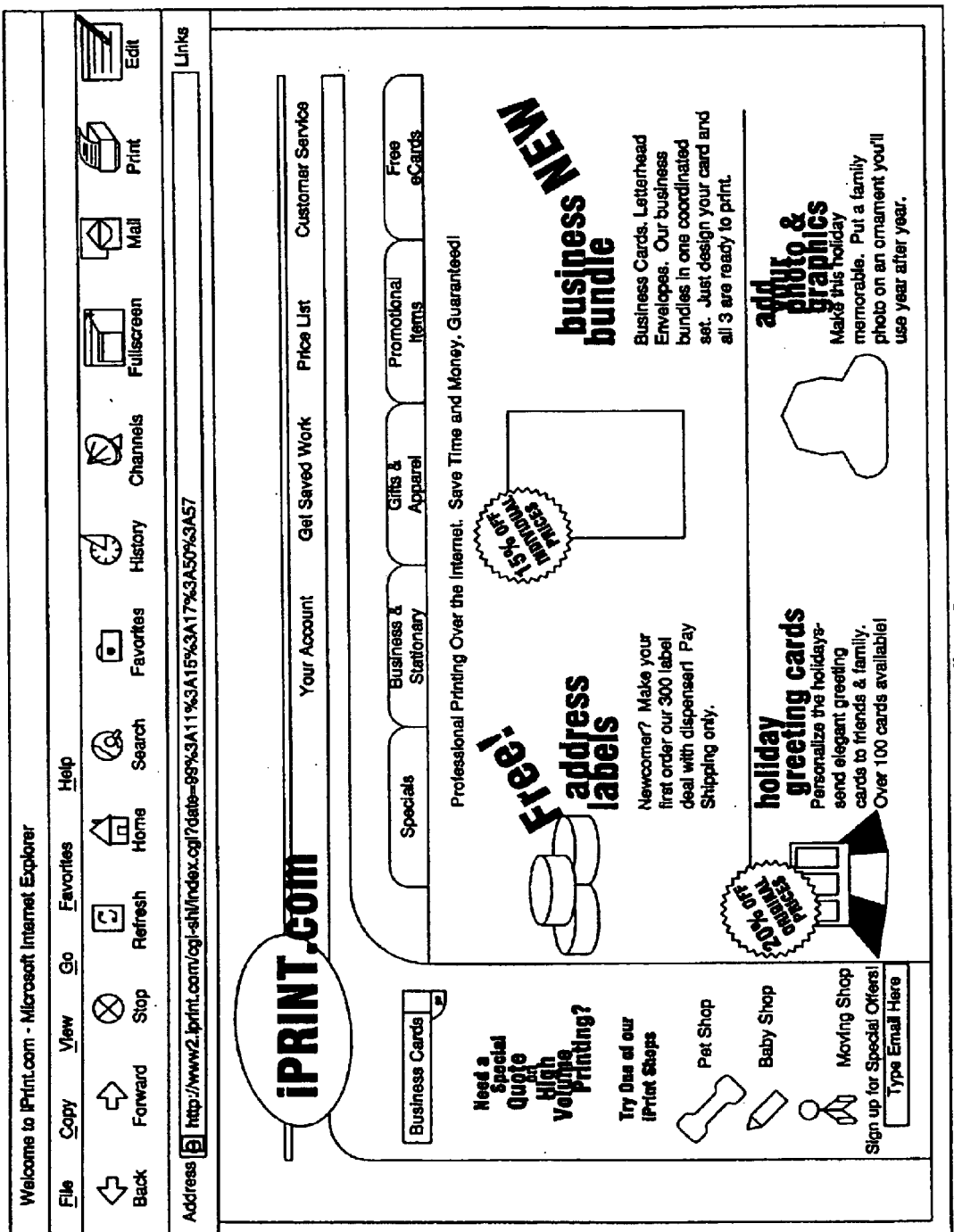
FIG. 2 illustrates a web page displaying a graphical user interface of the electronic printing system that may be available to a user.

When a user at the client 12 accesses the server hub 11 through the Internet 13, a graphical web page may be displayed to the user (from the web server 13a) via the browser interface on the client's 12 system. FIG. 2 shows a screen shot of a user interface 30 that may be displayed to the client 12. The user may interact with the electronic printing system 10 via the user interface 30. For example, the user may design a custom print order via the user interface 30 by initiating a design request for a custom print design and submit the custom design for processing and printing. Additionally, a user may modify the design, in which case the design change is automatically represented in the design files and conveyed graphically to the user. The custom print design may include custom print information, such as graphical information, audio-visual visual information, image information, textual information, etc. Such information can be stored as binary data or ASCII characters (the ASCII characters or binary data define text information and may also define generic file information).

Upon the user creating a custom print design, the electronic printing system 10 may store the design information until an order is placed. Every order may have an order file and one or more associated design files. The design files may describe the initial layout of a print design and may reflect updates to the initial layout based upon the custom design created by a user. The design files may also describe non-print items associated with the custom print information, such as second sheets, etc. An imaging engine (resident on an image server 13b) may convert the information in the design files into a graphic file for on-screen representation and a process server 13d may convert the design files into a "ready-to-print" output file that may be retrieved electronically by a remote printer facility. The output file may be formatted as an image file format, such as a raster file format or a vector file format. The image file format can be, for example, an .EPS file format, a .JPG file format, a .GIF file format, a .PDF file format, textual, or any other such format.

The order file may contain user information and product data, such as a user's billing and shipping address, payment and pricing information, and the media type desired. When an order is submitted, both the order file and the design files may be staged for conversion. These files may be converted to printer specific files and may be sent to or retrieved by a local or remote printing facility and the user's order may be carried out by the printing facility and may be sent to the user when completed.

Figure 3A:
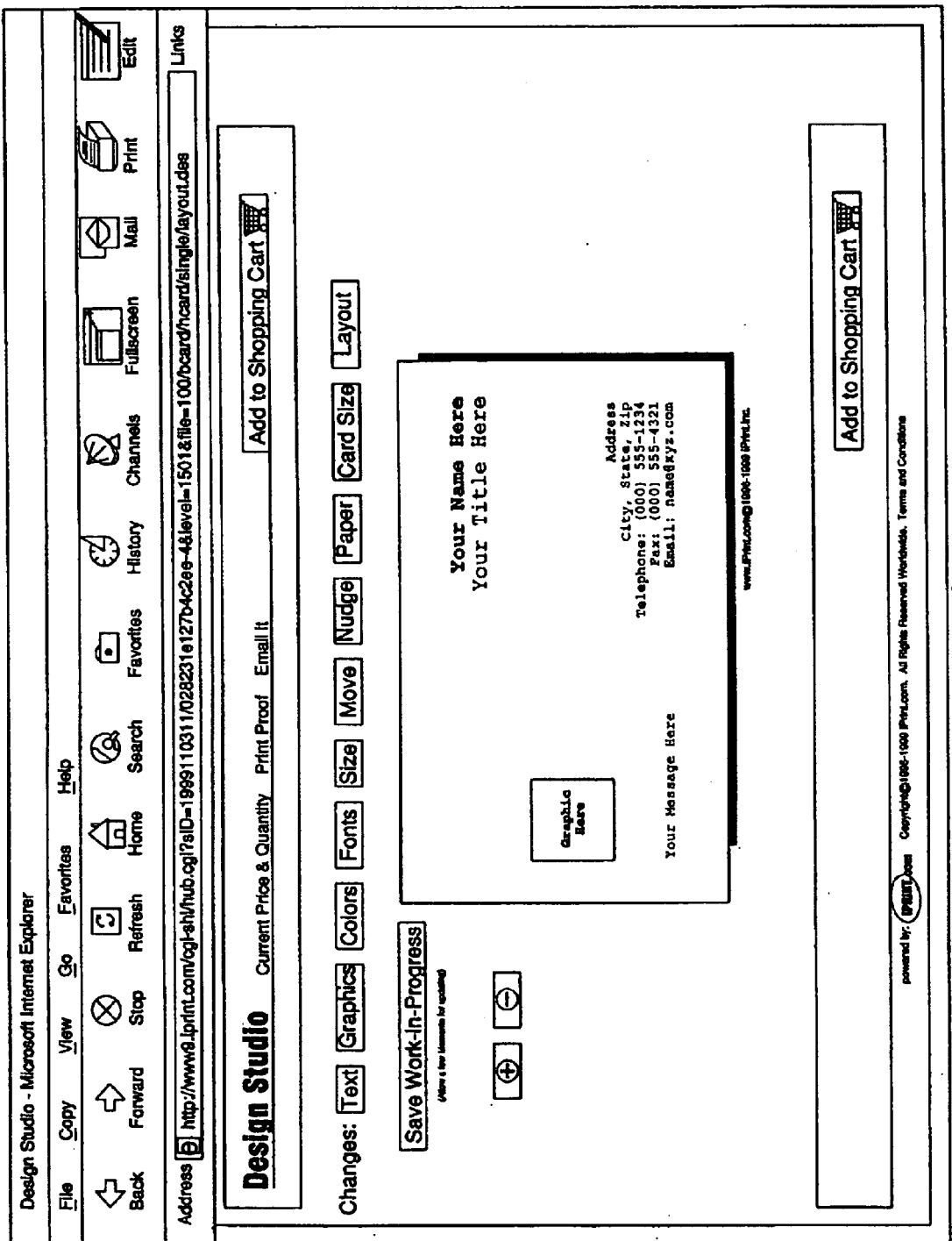
FIG. 3A illustrates a graphical representation of a default business card that is displayed to a user upon a user initiating a design function.

FIG. 3A illustrates a graphical representation of a default business card that is displayed to a user upon a user initiating a design function in accordance with the invention. Generally, a user may select a desired product, such as a business card, a T-shirt, or the like from a menu of product choices via the browser interface 30. Upon the user selecting a desired product, a list of pre-designed templates may be displayed to the user, from which the user may select a default design template to begin customizing a print design order. A graphical representation of the default design template may be displayed to the user (FIG. 3A) that the user may then customize and modify to create a desired design. It should be noted that a user is not bound to the selected product template. Product layouts may be changed at any time.

FIG. 3B illustrates an example of a design file 40 that may be created by the electronic printing system 10 in accordance with the changes that the user may make to the default design template such as shown in FIG. 3A. The design file 40 may be updated in real time to reflect the changes. Generally, every print item, such as a business card, a T-shirt, a mug, etc., has associated design files, per side, that describes the design layout. The design files may be structured textual document files that may describe the initial layout of the design item, the placement of objects in the design item, and attributes of those objects. As a user modifies a default design file for a print order, for example by entering text, moving or coloring an object, new design files may be created by the system 10 to reflect the modifications to the default design layout which may then be sent to the image server to create a new image that may be displayed to the user reflecting the modifications.

As shown in FIG. 3B, the design file 40 contains a textual description of the initial layout of a business card. However, a design file 40 could contain a textual description of elements in a layout of any custom design. The size of the business card, any textual, graphical and line objects to be associated with the business card, for example, font preferences and colors, may be reflected as textual design elements 41 in the design files. However, it should be noted that the design elements 41 are not limited to these attributes and may include any product attributes. For example, in the design file 40 of FIG. 3B, a design element 41 is illustrated describing the layout preferences for a graphical object. The color of the object, the alignment and the spacing of the object on the business card may be defined in the design file 40. Similarly, a design element 41 is illustrated describing the layout preferences for a design line. The color, style and spacing of the design line on the business card may be defined in the design file 40.

In addition, objects in the design files may be replicated multiple times for certain design products. For example, in the case of a business check product, if a user chooses to design and order a 3-up laser check (a sheet of three checks), such as that shown in FIG. 4, the user's name, address, MICR (bank account and routing information) and bank address information is replicated on every check. In the associated design files, the replicated information can be identified and the location of the information on the checks can be modified. Therefore, if the user chooses to modify the font style, add a graphic, or change any text, the changes will appear on all of the checks. Items can also be replicated on a single check. In addition, numbers (such as check numbers) may be incremented and automatically populated on the checks. It should be noted that the information replication aspect of the present invention is applicable to all design products and is not limited to checks and has merely been described in this embodiment for illustrative purposes.

The types of design elements 41 available in a custom print design may vary depending upon the print medium. In the context of a business card, the available design elements 41 may include graphics, lines and text. It should be noted that the number of design elements 41 that may be included in design files is unlimited. The required attributes for a design element 41 may vary depending on the object. Typically, the attributes may define an object, the position of the object on the design, its style elements, and its size.

Figure 3C:
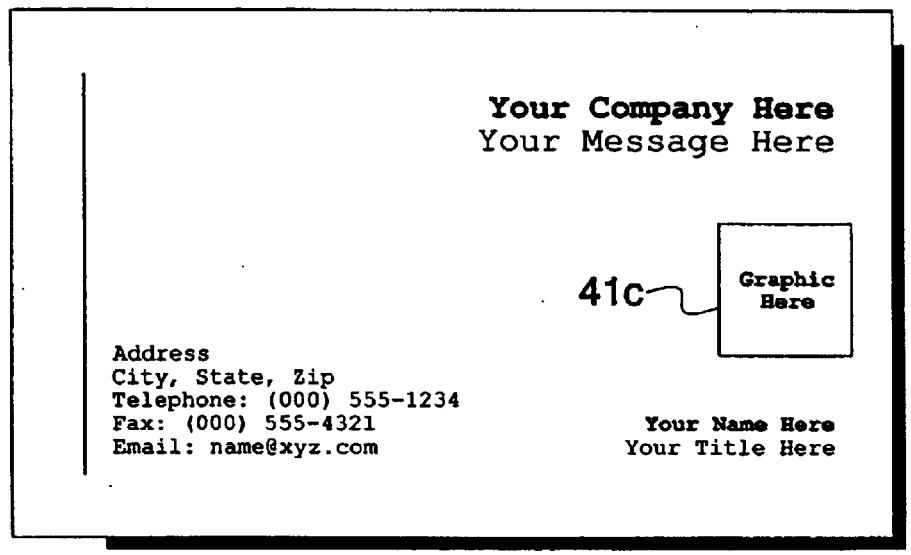
FIG. 3C illustrates an associated graphical representation of the design file of FIG. 3B that may be displayed to a user in real-time to reflect modifications to the design file.

Returning again to FIG. 3C, an associated graphical representation of the design file of FIG. 3B that may be displayed to a user in real-time to reflect modifications to a default design file is shown. In particular, the image server 13b may parse the textual information included in the design files and may return a graphical image 41c (stored on the graphics server 13c) representative of the design described by the design files to be displayed to the user in real-time. The image server 13b may convert the textual information into a GIF graphic, or any other graphic file, that may be a screen representation of the layout of the custom design. Therefore, a user may be able to immediately visualize the changes and modifications that are made to a custom design before submitting the design for processing and remote or local printing.

Users may additionally upload a graphic to be incorporated into a custom design by either uploading the graphic from a disk or via a URL. In the case where the user uploads a graphic from a disk, the user selects the graphic desired (the electronic printing system 10 may support various image files) and upload the graphic to the electronic printing system 10. Once uploaded, the graphic may be stored on a file server 13e (FIG. 1). The electronic printing system 10 may analyze the graphic and convert the uploaded image so that it may be utilized in the custom design. The converted or original image may then be used by the imaging engine so that the product is redrawn to include the uploaded image.

In the case of a user uploading a graphic via a URL, the user may provide the URL location of the graphic image and the electronic printing system 10 retrieves the image and uploads the image from the URL so that it may be included in the custom design. The electronic printing system 10 may analyze the graphic and convert the uploaded image so that it may be utilized in the customer design. The converted or original image may then be used by the imaging engine so that the product is redrawn to include the uploaded image.

In addition, the electronic printing system 10 may incorporate black/white-grayscale capability to convert uploaded user graphics to be incorporated into single or two-color products. For example, in a case where the user uploads a full color image onto a single or two-color product, the electronic printing system 10 may convert the full color image to a grayscale image. Alternatively, the image may be separated into its component color separations.

Figure 5A:
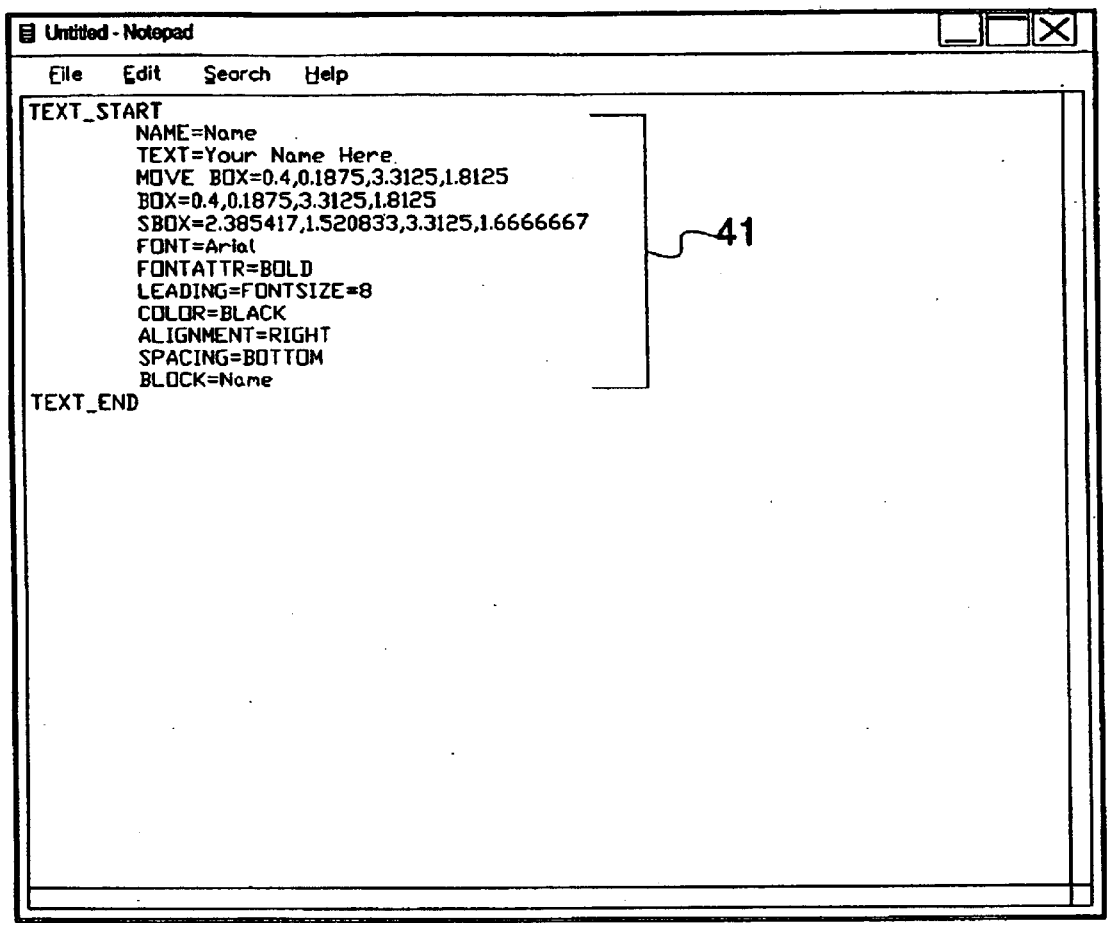
FIG. 5A illustrates a portion of a design file that is created by the electronic printing system when a user designs a text design element.
Figure 5B:
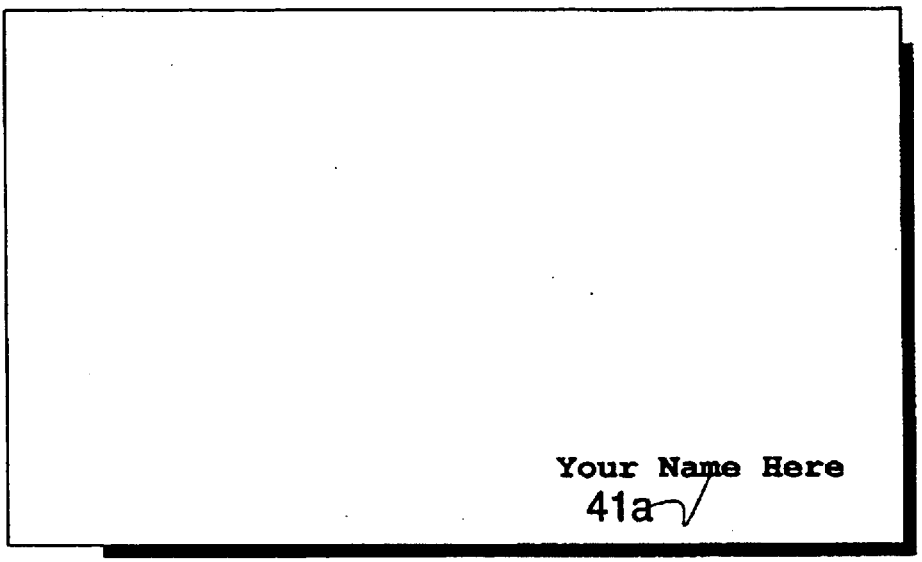
FIG. 5B illustrates an associated graphical representation of the portion of the design file of FIG. 4A that may be displayed to a user in real-time.
Figure 6B:
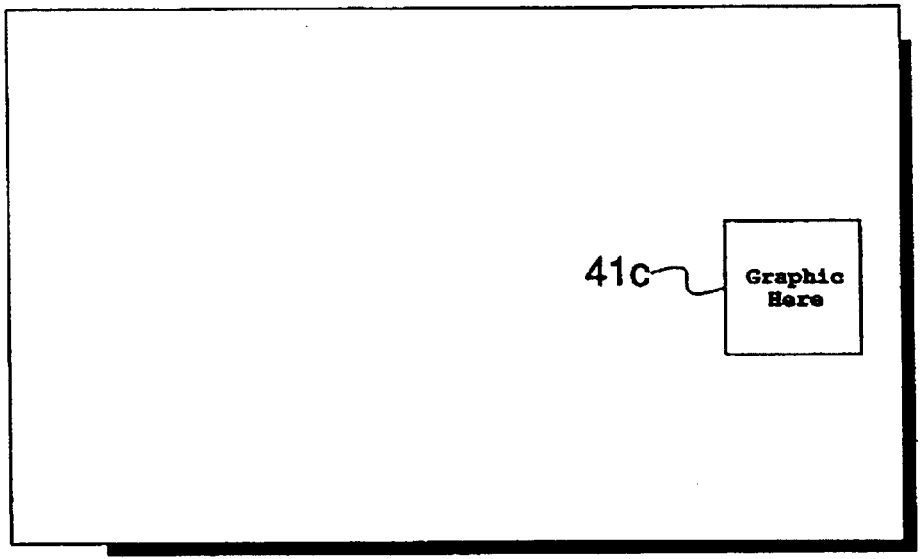
FIG. 6B illustrates an associated graphical representation of the portion of the design file of FIG. 6A that may be displayed to a user in real-time.
Figure 7A:
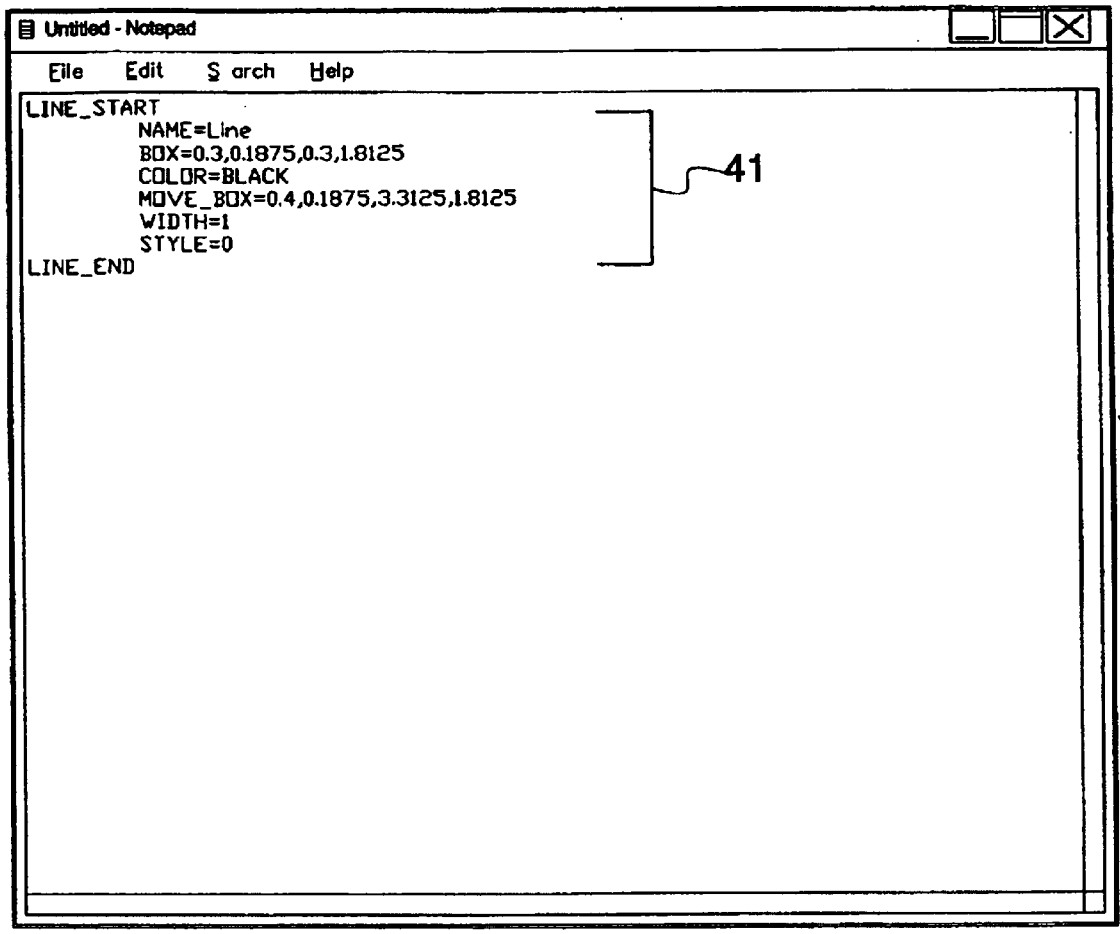
FIG. 7A illustrates a portion of a design file that is created by the electronic printing system when a user designs a line design element that may be displayed to a user in real-time.
Figure 7B:
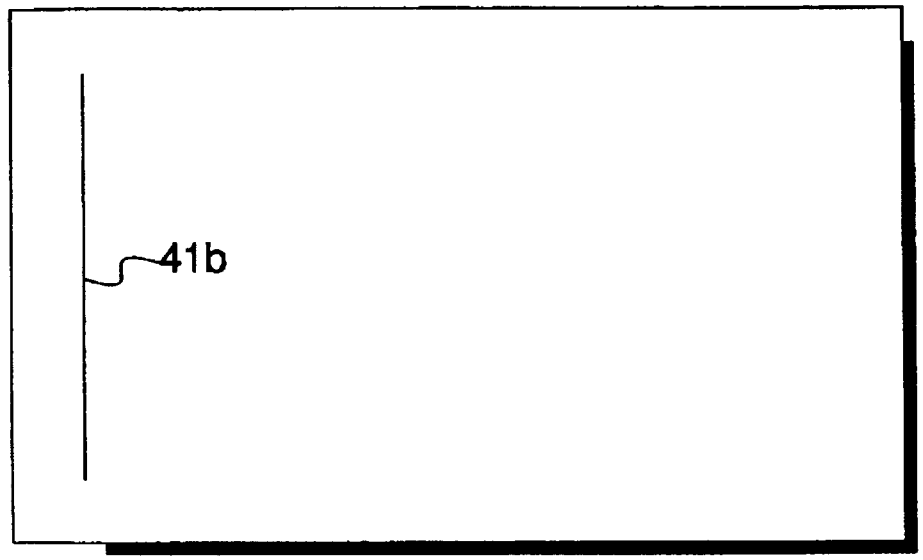
FIG. 7B illustrates an associated graphical representation of the portion of the design file of FIG. 7A that may be displayed to a user in real-time.

The following are examples of three types of design elements 41 (shown in FIGS. 5–7) that may be utilized in the electronic program system 10 in accordance with the invention and defined in a portion of a design file. FIGS. 5A and 5B show a portion of a sample design file (FIG. 5A) and a graphical image displayed to a user (FIG. 5B) as a result of an image server 13b parsing the design file and returning a resulting graphical image to the user for a text design element 41a. FIGS. 6A and 6B show another portion of a sample design file (FIG. 6A) and an associated graphical image (FIG. 6B) for a graphic design element 41c. FIGS. 7A and 7B show yet another portion of a sample design file (FIG. 7A) and an associated graphical image (FIG. 7B) for a line design element 41b. While three different design elements 41a–c are shown, the invention is not limited to these design elements 41a–c and may define an unlimited number of different design elements. The three examples will be described in more detail herein.

Referring to FIG. 5A, a portion of a design file 50 for a textual design element 41b is shown. Font size, style and other attributes may be defined for the design element 41 in the design file 50. The spacing above and below the actual text of the text design element 41b may be specified (represented in FIG. 5A by the variable "LEADING") so that lines of text do not overlap when printed on a custom design. Typically, the "LEADING" variable may be calculated automatically by the image server 13b as a user modifies the text attributes or when a graphical representation of the design file 50 is redrawn on a display screen in accordance with user modifications. Generally, the spacing depends on the font style and size.

The placement of textual information on a print design, such as a business card, may also be defined in the design file 50. The moving alignment (justification), the placement of objects and the overlapping of objects may be defined by establishing boxes (represented in the design files as variables "MOVE_BOX", "BOX" and "SBOX"). Further, the alignment and the spacing of the textual object within the previously defined boxes may be defined in the design file 50.

The "MOVE_BOX" variable normally defines the borders of a move area within the design area. Alternatively, "MOVE_BOX" can define a more specific area for the placement of objects within the custom design area. The image server 13b uses the "BOX" coordinate information to determine the "SBOX" coordinate information. The "SBOX" coordinate information specifies the precise coordinates of an object on the design area. By defining the "SBOX" variable, the user can easily adjust the placement of an object within the custom design. Therefore, the "SBOX" variable may allow for precise control of alignment of objects in a custom design.

The "BOX" variable may be defined so as to allow a user to accurately position a design element 41. Thus, the "BOX" variable provides a user with unique placement options within a custom design. When placing graphics into a custom design, the size of a graphic is directly related to it's defined "BOX" size.

FIG. 5B shows a graphical image displayed to a user as a result of an image server 13b parsing the portion of the design file 50 of FIG. 5A and returning a resulting graphical image to the user. As shown, a graphical image of a business card relating to the design file includes a graphical indication of the text "Your Name Here" at the bottom right quadrant of the business card.

FIG. 6A shows a portion of a sample design file 50 for a graphical design element 41c. While the design file 50 for a graphical design element 41c is similar to a design file 50 for a textual design element 41a, such as that shown in FIG. 5A, design files 50 for a graphical design element 41c may include an additional definition variable ("FILE") that may specify the name of a graphic file used in the custom design by listing the directory in which the graphic file resides on the file server 13e followed by the graphic name and file extension.

FIG. 6B shows a graphical image that relates to the design file 50 of FIG. 6A. As shown, a graphical image of a business card relating to the design file includes a graphical indication of an image graphic that is included on the business card at the rightmost quadrant of the business card.

FIG. 7A shows a sample portion of design files 50 for a line design element 41b. While the design file 50 for a line design element 41b is similar to the design files 50 for both the textual design element 41a and the graphical design element 41c, such as shown in FIGS. 5A and 6A, design files 50 for a line design element 41b may include additional definition variables to specify the line width (in pixels) and the line style (solid, dashed, etc.).

FIG. 7B shows a graphical image that relates to the design file 50 of FIG. 7A. As shown, a graphical image of a business card relating to the design file includes a graphical indication of a line that is included on the business card at the leftmost three quadrants of the business card.

Figure 8:
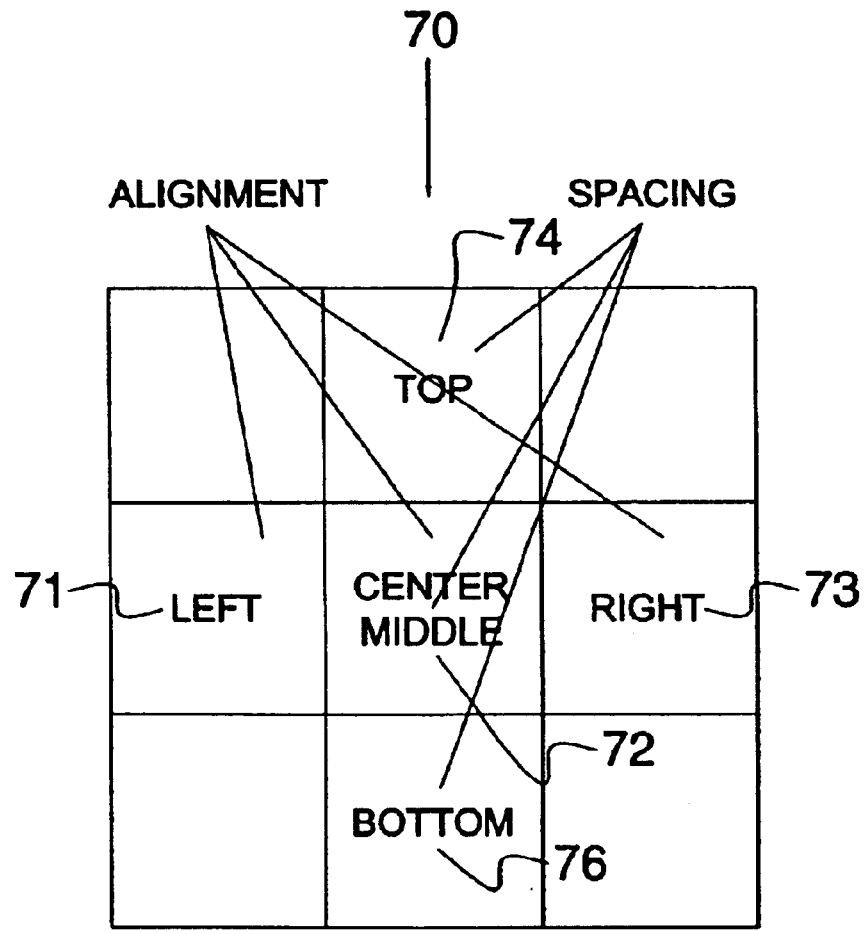
FIG. 8 is a plan view of a business card showing a regional grid that may be defined on a custom design so as to define justification regions and positioning regions on the design area.

The alignment and spacing of custom designs may be defined in design files to identify a regional grid 70 on a design item, such as that shown in FIG. 8. For alignment purposes, consider the horizontal axis of the grid to consist of a left region 71, a center region 72 and a right region 73 (similar to text alignment terms used in word processing). The spacing considers the vertical axis of the grid 70 consisting of a top region 73, a middle region 72, and a bottom region 75.

The graphical, textual and line design elements 42, 43, 44 may be combined in a single design file to create a custom design. Referring again to FIGS. 3A–C, a sample design file is shown (FIG. 3B) 30 for a business card having textual, graphical and line objects thereon, and a resulting graphical image 31 of the business card (FIG. 3C) that may be displayed to a user via the browser interface 30 is shown.

The operation of the network system 10 will now be described in detail with reference to the various servers 13a–e. A web server 13a may provide the user interface (shown in FIG. 2) to a client 12 that may provide an interactive design tool to the user so that the user may create a custom print design. The web server 13a may be configured to retrieve the custom design information input by the user and may create and update design files accordingly. The web server 13a may also be configured to initiate a billing procedure, such as a pre-authorization procedure.

In operation, when a user (client 12) initiates a design function, graphics information may be obtained from the graphics storage location (the graphics may be stored on the image server, the file server, or any server capable of storing image data) and may be conveyed to an image server 13b so that the graphics information may be parsed into image files that may be displayed to a user via the browser interface to reflect user modifications to an initial design. Now the operation of the system 10 will be described.

Figure 9:
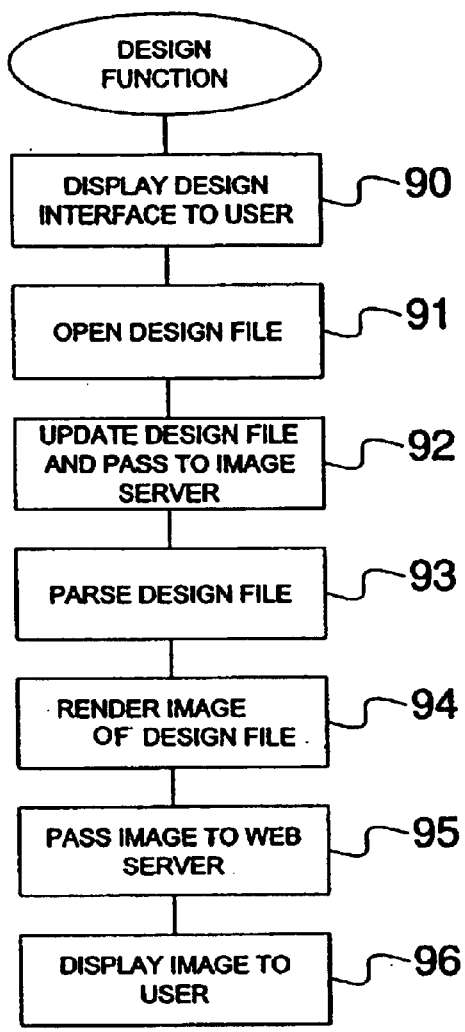
FIG. 9 is a flowchart showing the operation flow of the electronic printing system when a user initiates a design function.

FIG. 9 is a flowchart illustrating the operation flow of the electronic printing system 10 (see FIG. 1) when a user initiates a local design function. A design tool interface 30 (see FIG. 2) may be displayed to the user through the browser interface (Step 90). A web server 13a (see FIG. 2) may open a default design file for a selected design product and may initiate the creation of a new item in an order (Step 91). The design options that are presented to a user may be dependent on the design rules located in the database(s) 25. The web server may update the design files to reflect a change made by the user to the default design and may pass this information to the image server (Step 92), where the information may be parsed (Step 93) and rendered as an image file (Step 94) and returned to the web server 13a (Step 95) and downloaded by the user for display to the user through the user interface (Step 96).

The image server 13b may include a graphics conversion program that may parse textual information (from design files) into graphical images so that the web server 13a may convey these graphical images to the user through the browser interface 30 in real time. Thus, every time a user modifies a design by modifying design files, the web server 13a may update the design information and pass that information to the image server 13b. The image server 13b may parse the textual information, render a graphical image reflecting the design update, and return the graphical image to the web server 13a so that it may be displayed to the user through the browser interface.

In the electronic printing system 10, there may be multiple image servers 13b and multiple web servers connected to the server hub 11. In such case, data traffic between the web server 13a and the image servers 13b may be controlled by a traffic broker. The traffic broker may receive information from the web server 13a, determine which of the plurality of image servers 13b may presently be able to handle the task due to a light information load, and may pass the textual information to that image server 13b so that the information may be parsed into a graphical image file, at which time the traffic broker may return the graphical image to the requesting web server 13a. Upon finishing a custom design order, the user may submit the design order to the electronic printing system 10 for processing.

Figure 10:
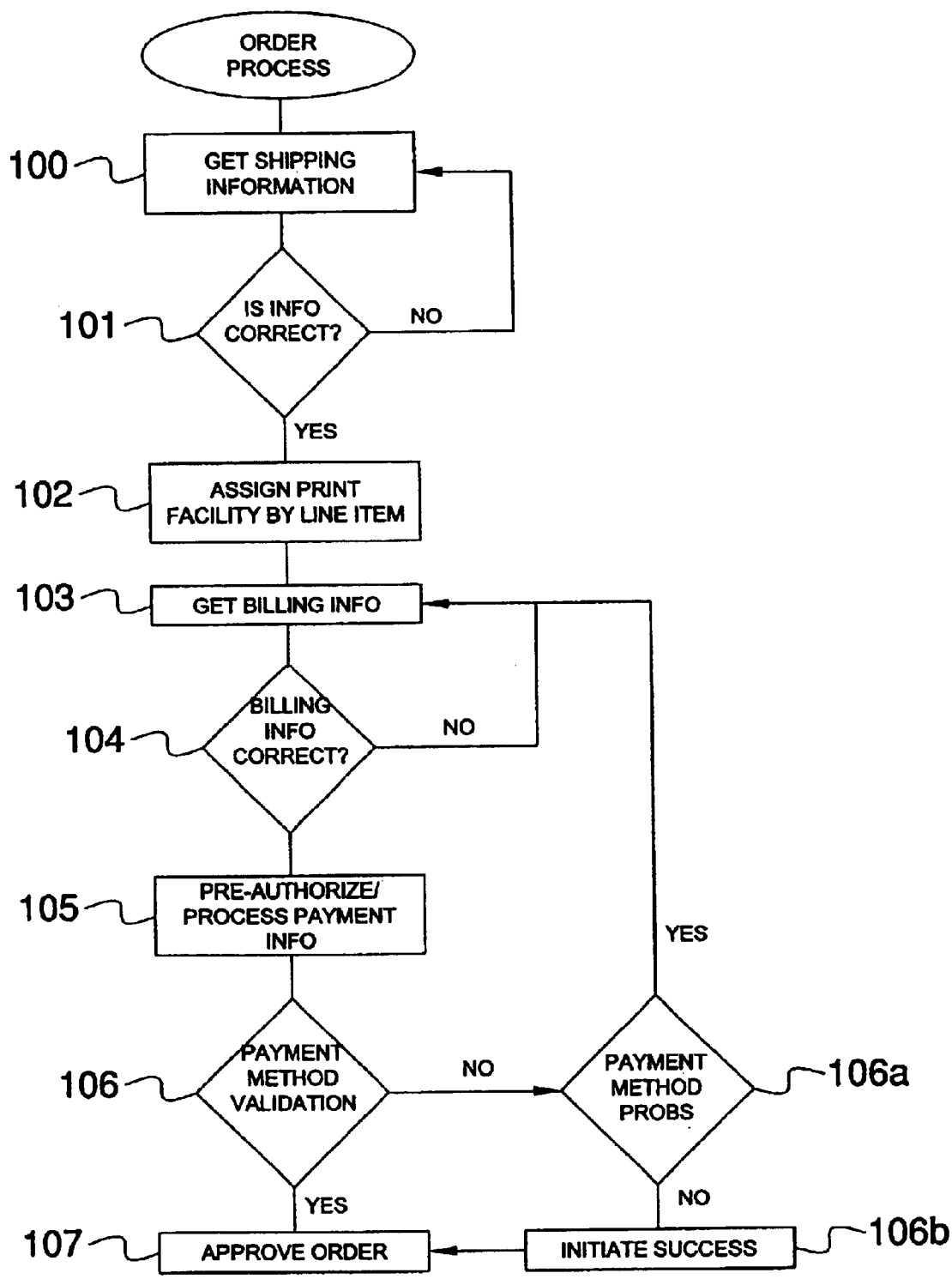
FIG. 10 is a flowchart illustrating the operational flow of the electronic printing system when a user submits an order for processing by the electronic printing system.

FIG. 10 is a flowchart illustrating the operational flow of the electronic printing system 10 when a user initiates a custom design on the electronic printing system 10. When submitted, an order file may be created that may include information pertaining to pricing, shipping and billing information. This information may be retrieved to process an order (Step 100). During creation, the web server 13a may check the order files to ensure that the billing and the shipping information is correct, that payment information, such as credit card billing information, is valid (Step 101) and provided that all order information is correct, may assign a print facility that can handle the order by line item information in the order file (Step 102). If the information is not correct, the system 10 may request additional information to complete the billing and shipping information.

After assigning a print facility (Step 102) the system 10 may get billing information from the order file (Step 103). The system may then check whether the billing information is correct (Step 104). If not correct, the system 10 may again attempt to gather the correct billing information (Step 103). If billing information is correct the system may process the billing information (Step 105). If payment is to be made by credit card, the system 10 may preauthorize the credit card purchase (Step 105). If payment information includes credit card billing information, before approving an order, the web server 13a may initiate an associated credit-card clearing house function for pre-authorization of the payment (funds may be reserved without actually charging the credit card). If payment has been validated (Step 106), the system 10 may then approve the order (Step 107). If payment has not been validated, the system 10 may determine whether a payment method problem exists (Step 106a). If so, the system 10 attempts to gather correct billing information (Step 103). Otherwise, the system 10 approves the order (Step 107).

It should be noted that other methods of accepting orders are available, such as purchase orders, in lieu of credit card payments. In the case where a purchase order is used, the purchase order may be validated against an internal or an external database(s) at the billing information screen. Therefore, a user may not place an order without placing a valid purchase order number to the electronic printing system 10.

Printer specific files may be generated by the back end system, which will be described herein. These printer specific files may contain information such as what printer to send the file to and inventory codes that may be printer specific such as product, ink color, quantity, etc. When orders have been approved (Step 107), the electronic printing system 10 may stage the order (as printer specific files, such as BEP and image files) so that the order may be retrieved electronically by a remote printing facility.

In order to convert the design files into an image file that may be utilized by any remote printing facility (such as an encapsulated postscript file, EPS file), the design files must be processed by the electronic printing system 10. The process server 13d (see FIG. 1) may be configured to process orders received from the client 12 and output files that may be retrieved by a remote printing facility. Additionally, the process server 13d may track ship notifications and may update customers via email when their respective orders have been shipped. The process server 13d may also perform post-authorization of orders.

Figure 11:
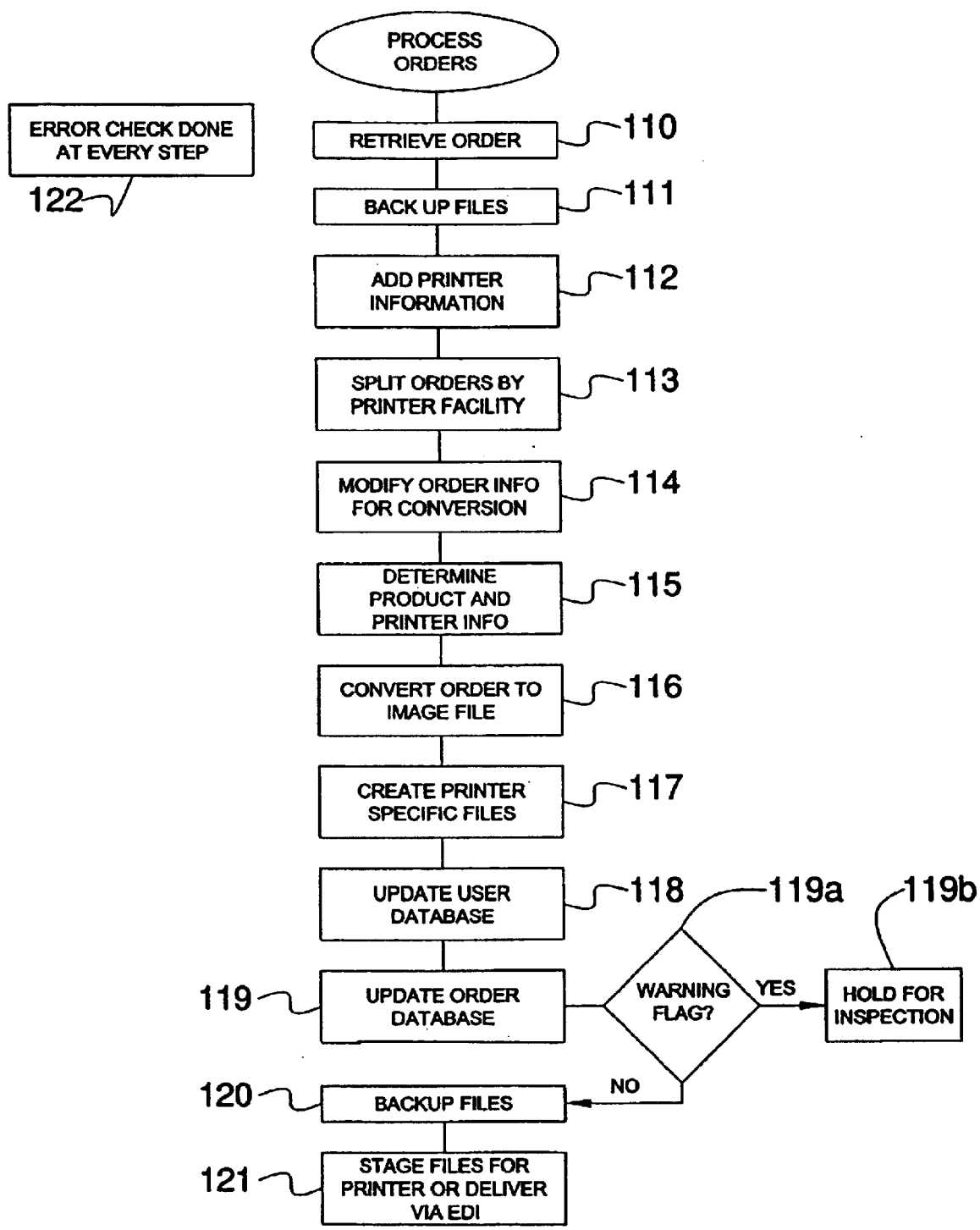
FIG. 11 is a flowchart illustrating the operational flow of the process server of the electronic printing system.

FIG. 11 illustrates the operational flow of the process server 13d. Initially, the process server 13d may retrieve an order that may have been submitted by a client 12 and staged by the electronic printing system 10 in a staging directory resident on a file server 13e or resident in a database(s) 25. In retrieving the order, the process server 13d may access the staging directory or database(s) and locate a staged order and all associated files that may have been stored by the electronic printing system 10 (Step 110). After the staged order has been retrieved by the process server 13d, the files are backed up (Step 111) and printer facility information may be added to the staged order (Step 112). This information may be determined at the time the user is designing the custom print order. After adding the printer facility information to the order, the process server 13d may split orders, for example, by printer facility (Step 113).

Once a print order has been completed by the process server 13d, the process server 13d may modify the order in preparation for conversion of the design files to an image file (Step 114). For example, all non-printable information may be removed from the design files. The process server 13d may then determine product and printer facility information from the order file (Step 115), and parse the design files into an image file, such as an EPS file (Step 116), that may be utilized by a printer facility. The image file could be of any image-type format.

The parsing operation may be an automated back-end operation. Both spot printing plates and CMYK printing plates may be defined in the image file, among other printing plate designations, such as composite spot printing plates, etc. Spot printing plates utilize a black background printing plate to which different color ink may be added in order to create a print. For example, in the case of a print order in which a business card having a green ink color portion thereon may be defined in a design files, the image file may specify a black background plate and a green ink preference or may be defined on a secondary information file. CMYK printing plates may use four separate plates, cyan, magenta, yellow and black, or a composite plate for full color printing. Process color printing information, such as CMYK information, RGB (red, green, blue) information, or other color information where each color is represented as a separate printing plate. Process color printing information may be represented in separate printing plates or as a composite plate. This information may be specified in the image file.

Depending upon the product ordered by a customer and/or the designated printer facility, the process server 13d may retrieve an order number associated with the order request and may create a printer specific file associated with the information that may not be included in the converted image file, such as product, paper color, media type, etc (Step 117).

Printer specific files may include printer facility specific information, such as attributes and the like.

The process server 13*d* may then add the user information to a user database(s) (Step 118) and may update an order database(s) with the user order information (Step 119). In the case of a warning flag occurring in creating the image file or in a case where the image file may include uploaded graphics, overlays and other check point formats, from a client 12, the image file may be printed and held for visual inspection so that a hard copy of the image file may be inspected (Steps 119*a* and 119*b*).

The process server 13*d* may then backup all the printer specific files (Step 120) and compress them, such as by zipping the printer files, and copy the compressed files to an appropriate location so that the compressed files may be downloaded by a remote or local printer facility (Step 121) or stage to an EDI server on an order by order basis. The printer specific files may include printer identification information, or printer specific inventory codes, such as product information codes, ink color codes, quantity information codes, etc. The process server 13*d* may also include a backend module for tracking order ship status and for notifying customers of shipped orders. It should be noted that error checking is performed at every stage in the process (Step 122). Those files that result in failures are placed on hold for correction at a later time.

Figure 12:
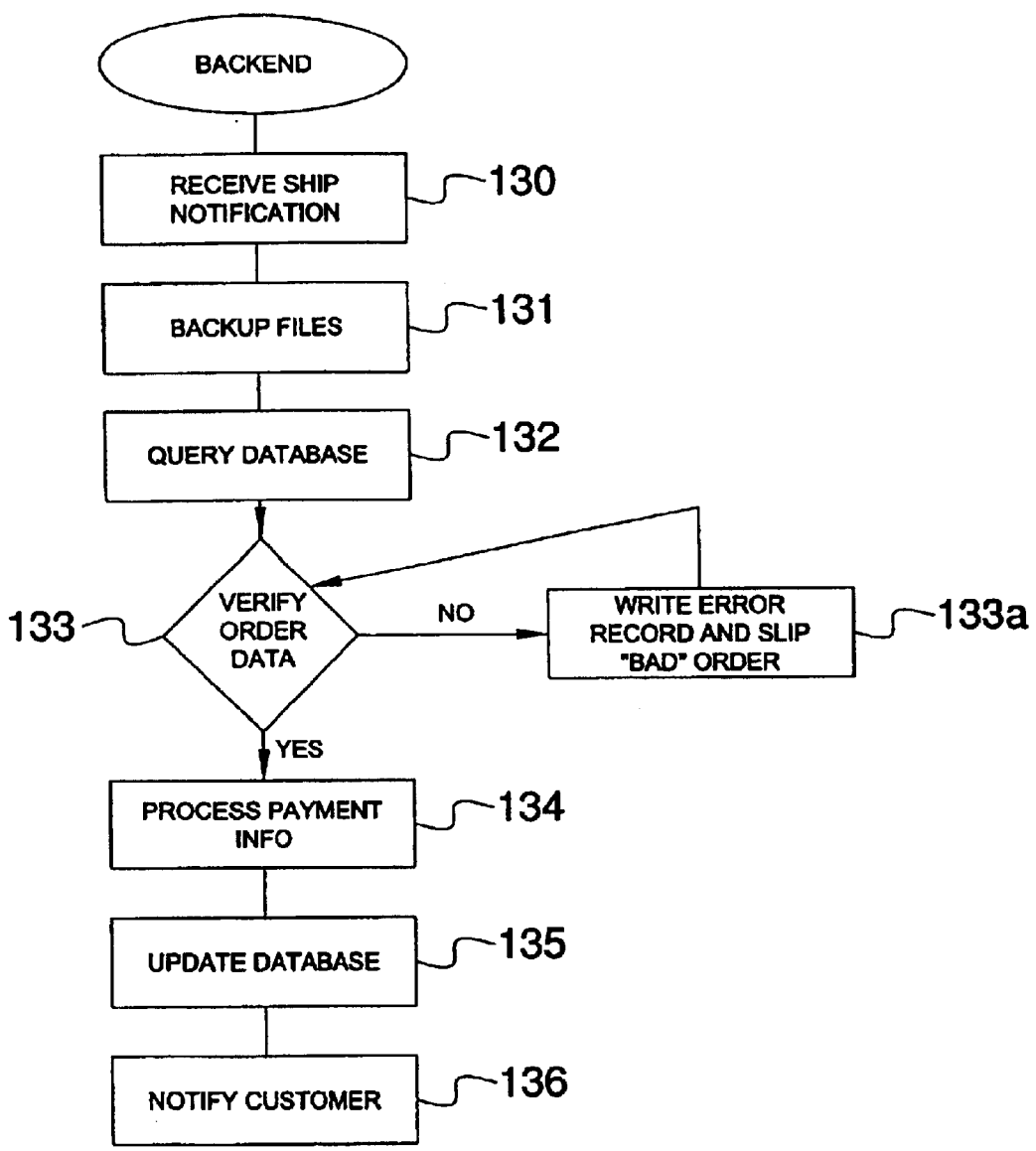
FIG. 12 is a flowchart illustrating the operational flow of the backend module of the process server.

A flowchart of the operational flow of the backend module is shown in FIG. 12. The backend module may receive ship notifications (Step 130). In particular, remote printing facilities may notify the electronic printing system 10 of shipped orders using several notification methods. For example, in a case in which a printer facility may be non-automated, notifications may be made using an extranet. The extranet may be an Internet-enabled tool that may allow printing facilities to access a list of open orders. The printing facility may then mark an order as shipped and provide a tracking number for the shipped product. This information may be accessed by the electronic printing system 10. Alternatively, an EDI system 130 may be included to facilitate the transfer of information between the printer facilities and the electronic printing system.

Alternatively, an automated printing facility may utilize a computer system resident within the facility that may be connected remotely to the electronic printing system 10 and generate data that may contain order numbers, shipping information, etc. The data may be accessed by the electronic printing system 10.

Returning to FIG. 12, after retrieving the ship notifications, the information may be backed up (Step 131) and the order database(s) may be queried (Step 132) to obtain an order record and any associated data. The order data may then be verified (Step 133) and in the case of an error, the error may be logged and the nonconforming order may be skipped (Step 133*a*). After obtaining the order record, a user's payment information may be processed, for example, the user's credit card may be post-authorized (Step 134). The order database(s) may then be updated to reflect the shipped and post-authorization status and shipper/carrier and tracking information (Step 135). The customer may then be notified via email of a ship notification (Step 136).

It should be noted that in certain instances during the order process carried out by the process server 13*d*, errors may occur during one of the stages that may adversely affect the order being carried out correctly. In such a case, the order is corrected.

While the foregoing has been described with reference to particular embodiments of the invention, such as the design of business cards, the invention is not limited to such products and may be applicable to any media. It will be appreciated by those skilled in the art that changes in these embodiments may be made without departing from the principles and spirit of the invention.

What is claimed is:

1. An electronic printing system, comprising:
   a server, including:
      means for providing a design interface for a custom print job;
      means for receiving custom print information relating to the custom print job via the design interface;
      means for storing the custom print information in the server;
      means for modifying the custom print information if desired via the design interface;
      means for dynamically displaying the custom print information as it is modified;
      means for formatting the custom print information and for generating a print order; and
      means for providing the formatted custom print information and print order to a printing facility; and
   at least one printer in communication with the server, the at least one printer configured to receive the formatted custom print information from the server and to process the print order in accordance with the custom print information.

2. The electronic printing system of claim 1, wherein the custom print information includes any of graphical information, audio-visual information, image information and textual information.

3. The electronic printing system of claim 2, wherein the textual information includes binary data.

4. The electronic printing system of claim 2, wherein the textual information includes ASCII data.

5. The electronic printing system of claim 2, wherein the custom print information is provided from a client system in communication with the server.

6. The electronic printing system of claim 1, wherein the custom print information is included in at least one design file that describes the layout of a custom print design item associated with the custom print information.

7. The electronic printing system of claim 6, wherein the at least one design file further describes non-print items associated with the custom print information.

8. The electronic printing system of claim 6, wherein the layout of the custom print design item described in the design file is updated to indicate any modification to the custom print design item information.

9. The electronic printing system of claim 1, wherein the storing means comprises a storage system in communication with the server.

10. The electronic printing system of claim 9, wherein the storage system comprises a database.

11. The electronic printing system of claim 9, wherein the storage system includes a plurality of file structures therein, the plurality of file structures configuired to maintain a like plurality of data describing the custom print information.

12. The electronic printing system of claim 11, wherein the file structures comprise records.

13. The electronic printing system of claim 9, wherein the plurality of information stored in the storage system includes any of customer personal information, shipping information, customer billing information, order history information, order status information, pricing information, printer specific information, store attribute information, product attribute information and custom print design item information.

14. The electronic printing system of claim 1, wherein the modified custom print design item information is displayed in real-time.

15. The electronic printing system of claim 1, wherein the custom print design item information is modified in accordance with a predetermined ruleset for a selected print medium.

16. The electronic printing system of claim 1, wherein the custom print information is formatted into a format that is recognizable by the at least one printing facility.

17. The electronic printing system of claim 16, wherein the format is a textual file format.

18. The electronic printing system of claim 17, wherein the textual file format is a binary file format.

19. The electronic printing system of claim 16, wherein the format is an image file format.

20. The electronic printing system of claim 19, wherein the image file format is any of a raster file format and a vector file format.

21. The electronic printing system of claim 19, wherein the image file format is any of an EPS file format, a .JPG file format, a .GIF file format, a text file format and a .PDF file format.

22. The electronic printing system of claim 1, wherein the printer is a printing facility.

23. The electronic printing system of claim 22, wherein the printing facility is a local printing facility.

24. The electronic printing system of claim 22, wherein the printing facility is a remote printing facility.

25. An electronic printing system, comprising:
a server, including:
means for providing a design interface for a custom print job;
means for generating custom print information relating to the custom print job;
means for storing the custom print information in the server;
means for modifying the custom print information if desired via the design interface;
means for dynamically displaying the custom print information as it is modified;
means for formatting the custom print information and for generating a print order; and
means for providing the formatted custom print information and print order to a printing facility; and
at least one printer in communication with the server, the at least one printer configured to receive the formatted custom print information from the server and to process the print order in accordance with the custom print information.

26. The electronic printing system of claim 25, wherein the custom print information includes any of graphical information, audio-visual information, image information and textual information.

27. The electronic printing system of claim 26, wherein the textual information includes binary data.

28. The electronic printing system of claim 26, wherein the textual information includes ASCII data.

29. The electronic printing system of claim 25, wherein the storing means comprises a storage system in communication with the server.

30. The electronic printing system of claim 29, wherein a plurality of information stored in the storage system includes any of customer personal information, shipping information, customer billing information, order history information, order status information, pricing information, printer specific information, store attribute information, product attribute information and custom print design item information.

31. The electronic printing system of claim 25, wherein the generating means comprises a design interface system configured to provide a template of at least one print design item to be printed on a selected print medium.

32. The electronic printing system of claim 25, wherein the custom print design item information is modified in accordance with a predetermined ruleset for a selected print medium.

33. The electronic printing system of claim 25, wherein the printer is a printing facility.

34. The electronic printing system of claim 33, wherein the printing facility is a remote printing facility.

35. The electronic printing system of claim 25, wherein the custom print information is formatted into a format that is recognizable by the at least one printing facility.

36. The electronic printing system of claim 35, wherein the format is an image file format.

37. The electronic printing system of claim 36, wherein the image file format is any of a raster file format and a vector file format.

38. The electronic printing system of claim 36, wherein the image file format is any of an EPS file format, a .JPG file format, a .GIF file format, a text file format and a .PDF file format.

39. The electronic printing system of claim 35, wherein the format is a textual file format.

40. The electronic printing system of claim 39, wherein the textual file format is a binary file format.

41. An electronic printing system, comprising:
a server, including
at least one server system configured to communicate with at least one client system, the at least one server system providing a design interface for a custom print job;
at least one image server system configured to receive custom print information, including custom print design item information, from the client system and to provide the custom print design item information to the design interface so that the custom print design item information can be dynamically displayed to the at least one client system to indicate any modification to the custom print design item information that is made;
at least one file server system configured to store the custom print information; and
at least one process server system configured to format the custom print information and to generate a print order;
each of the at least one server system, at least one image server system, at least one file server system and at least one process server system being in communication with each other so that custom print information can be provided between them; and
at least one printing facility in communication with the server, the at least one printing facility configured to receive the formatted custom print information from the server and to process the print order in accordance with the custom print information.

42. The electronic printing system of claim 41, wherein the custom print information includes any of graphical information, audio-visual information, image information and textual information.

43. The system of claim 41, wherein the at least one server system, the at least one image server system, the at least one file server system, and the at least one process server system each comprise respective software application modules resident on the server.

44. An electronic printing system, comprising:
- at least one server configured to communicate with at least one client system, the at least one server providing a design interface for a custom print job;
- at least image server configured to receive custom print information, including custom print design item information, from the client system and to provide the custom print design item information to the design interface so that the custom print design item information can be dynamically displayed to the at least one client system to indicate any modification to the custom print design item information that is made;
- at least one file server configured to store the custom print information; and
- at least one process server configured to format the custom print information and to generate a print order;
- each of the at least one server, at least one image server, at least one file server and at least one process server being in communication with each other so that custom print information can be provided between them; and
- at least one printing facility in communication with at least one of the servers, the at least one printing facility configured to receive the formatted custom print information from at least one of the servers and to process the print order in accordance with the custom print information.

45. The system of claim 44, wherein the at least one image server, the at least one file server, and the at least one process server each comprise respective software application modules resident on the server.

46. An electronic printing system, comprising:
- a server, including
   - at least one server system configured to communicate with at least one client system, the at least one server system providing a design interface for a custom print job;
   - at least one image server system configured to generate custom print design item information and to provide the custom print design item information to the design interface so that the custom print design item information can be dynamically displayed to the at least one client system to indicate any modification to the custom print design item information that is made;
   - at least one file server system configured to store the custom print design item information; and
   - at least one process server system configured to format the custom print design item information and to generate a print order;
   - each of the at least one server system, at least one image server system, at least one file server system and at least one process server system being in communication with each other so that custom print design item information can be provided between them; and
- at least one printing facility in communication with the server, the at least one printing facility configured to receive the formatted custom print design item information from the server and to process the print order in accordance with the custom print design item information.

47. The electronic printing system of claim 46, wherein the custom print design item information includes any of graphical information, audio-visual information, image information and textual information.

48. The system of claim 46, wherein the at least one server system, the at least one image server system, the at least one file server system, and the at least one process server system each comprise respective software application modules resident on the server.

49. An electronic printing system, comprising:
- a server, including
   - at least one server system configured to communicate with at least one client system, the at least one server system providing a design interface for a custom print job;
   - at least one image server system configured to receive custom print design item information and to provide the custom print design item information to the design interface so that the custom print design item information can be dynamically displayed to the at least one client system to indicate any modification to the custom print design item information that is made;
   - at least one file server system configured to store the custom print design item information; and
   - at least one process server system configured to format the custom print design item information and to generate a print order;
   - each of the at least one server system, at least one image server system, at least one file server system and at least one process server system being in communication with each other so that custom print design item information can be provided between them; and
- at least one printing facility in communication with the server, the at least one printing facility configured to receive the formatted custom print design item information from the server and to process the print order in accordance with the custom print design item information.

50. The electronic printing system of claim 49, wherein the custom print design item information includes any of graphical information, audio-visual information, image information and textual information.

51. The system of claim 49, wherein the at least one server system, the at least one image server system, the at least one file server system, and the at least one process server system each comprise respective software application modules resident on the server.

52. An electronic printing system, comprising:
- a server, including
   - at least one web server system configured to communicate with at least one client system, the at least one web server system presenting a design interface to the at least one client system;
   - at least one image server system configured to generate a default design file that includes default custom print design item information associated with a selected print medium, and to provide a graphical representation of the default custom print design item information to the at least one web server so that the graphical representation can, be displayed to the at least one client system via the design interface, and so that the default custom print design item information can be modified by the at least one client system if desired, the default design file being updated to include the modification to the default custom print design item information and the graphical representation of the updated design file being dynamically displayed to the at least one client system to visually indicate the modification to the custom print design item information that is made;
   - at least one file server system configured to store the updated design file; and
   - at least one process server system configured to format the updated design file and to generate a print order;

each of the at least one web server system, at least one image server system, at least one file server system and at least one process server system being in communication with each other so that updated design file can be provided between them; and at least one printing facility in communication with the server, the at least one printing facility configured to receive the formatted updated design file from the server and to process the print order in accordance with the updated design file.

53. The electronic printing system of claim 52, wherein the custom print design item information includes any of graphical information, audio-visual information, image information and textual information.

54. The system of claim 52, wherein the at least one web server system, the at least one image server system, the at least one file server system, and the at least one process server system each comprise respective software application modules resident on the server.

55. A method for creating a custom print design to be printed on a selectable print medium, the method comprising the steps of:

selecting a print medium for printing of custom print design item information;

generating a default design file associated with the selected print medium, the default design file including default custom print design item information;

displaying a graphical representation of the default custom print design item information;

updating the default design file to include any modification to the default custom print design item information; and dynamically displaying a graphical representation of the updated custom print design item information.

56. The method of claim 55, further comprising:

generating an order file associated with the updated custom print design item information; and processing the updated custom print design item information so that the updated custom print design item information can be retrieved by a printing facility.

57. The method of claim 56, further comprising:

storing the processed custom print design item information and the associated order file in a server so that the processed custom print design item information and the associated order file can be retrieved at a predetermined time interval by the printing facility; and processing the print order file in accordance with the updated custom print design item information so that the custom print design item information can be printed on a selected print medium.

58. The method of claim 57, further comprising the step of notifying of the completion of the print order.

59. The method of claim 55, further comprising:

generating an order file associated with the updated custom print design item information; and processing the updated custom print design item information so that the updated custom print design item information can be sent to a printing facility.

60. The method of claim 59, further comprising:

storing the processed custom print design item information and the associated order file in a server so that the processed custom print design item information and the associated order file can be retrieved at a predetermined time interval by the printing facility; and processing the print order file in accordance with the updated custom print design item information so that the custom print design item information can be printed on a selected print medium.

61. The method of claim 60, further comprising the step of notifying of the completion of the print order.

* * * * *